Figure 1:
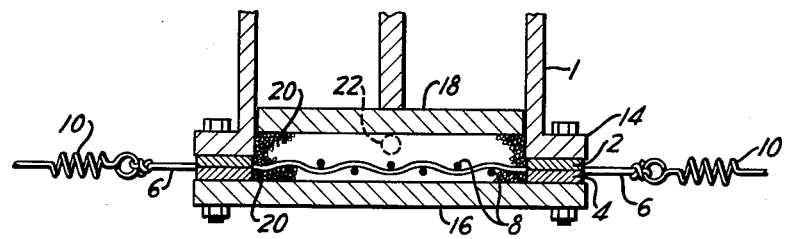

Nov. 21, 1961 P. D. FOOTE ET AL 3,009,578
PRE-STRESSED REINFORCED ION-EXCHANGE MEMBRANE
AND METHOD OF MAKING SAME
Filed April 15, 1958

INVENTORS
PAUL D. FOOTE
MALCOM R. J. WYLLIE
BY

ATTORNEY 3,009,578
PRE-STRESSED REINFORCED ION-EXCHANGE MEMBRANE AND METHOD OF MAKING SAME
Paul D. Foote, Washington, D.C., and Malcolm R. J. Wyllie, Indiana Township, Allegheny County, Pa., assignors to Gulf Research & Development Company, Pittsburgh, Pa., a corporation of Delaware
Filed Apr. 15, 1958, Ser. No. 728,576
11 Claims. (Cl. 210—496)

This invention relates to selectively permeable ionic membranes and to methods for making the same. More particularly, the invention relates to selectively permeable ion-exchange membranes of heterogeneous structure and having improved mechanical strength and permselectivity and having embedded therein a plurality of prestressed reinforcing members.

The ionic selectivity of selectively permeable ion-exchange membranes, that is, the ability of such membranes to exclude and/or to permit ingress of anions and cations, is of considerable importance in many practical usages of the membranes, for example, in the filtration of electrolytic solutions. The selectivity of a membrane with respect to a given ion in solution can be expressed quantitatively as its permselectivity. On the other hand, the conductance of ion-exchange membranes, that is, the reciprocal of the resistance of flow of an electrical current through such membranes, may be of paramount importance in other usages, for example, in electrodialytic operations. When maximum permselectivity is desired for a heterogeneous ion-exchange membrane, that is, a membrane comprising a plurality of electrolytically conductive ion-exchange particles bonded together with an electrolytically inert bonding material and having its opposing surfaces conductively connected by concatenated arrangements of said conductive ion-exchange particles, the ratio of inert bonding material to ion-exchange material in the membrane is usually relatively high, and the membrane is characterized by a relatively high degree of mechanical strength and a relatively low specific conductivity. When maximum specific conductivity is important, the ratio of inert bonding material to ion-exchange material in the membrane is usually lower, and the membrane is characterized by relatively lower mechanical strength, and often by somewhat reduced permselectivity.

It has now been found that the conductivity of heterogeneous ion-exchange membranes can be improved without sacrifice in mechanical strength, and that the permselectivity of heterogeneous membranes can be improved without sacrifice in specific conductivity. The present invention relates to the method of making heterogeneous ion-exchange membranes of such improved characteristics as well as to the membranes themselves. Briefly, in accordance with the present invention, a plurality of elongated reinforcing members are subjected to tension along their longer axes, and while such tension is maintained, a continuous, coherent resinous structure, comprising an electrolytically inert organic plastic matrix having a plurality of finely-divided, water-insoluble, electrolytically conductive ion-exchange particles substantially uniformly distributed therein in a proportion such that the opposing surfaces of such structure are conductively connected by a plurality of concatenated groups of such electrolytically conductive particles, is formed about said reinforcing members and then caused to harden, so that the reinforcing members become bonded to the continuous resinous structure. Although the continuous resinous structure is advantageously formed by molding under pressure, it can be formed by casting if desired. The reinforcing members may be oriented in one or more directions and in one or more planes. Preferably, the reinforcing members will be arranged in two or three intersecting groups of substantially parallel members. Especially good results are obtained by arranging three groups of parallel reinforcing members at right angles to each other. Although the application of any substantial tension to the reinforcing members will improve the mechanical strength and permselectivity of the membrane to some degree, it is preferred that the tension applied equal or exceed the osmotic pressure, that is, the internal swelling pressure of the ion-exchange particles incorporated in the membrane. The osmotic pressure of the ion-exchange particles in a heterogeneous ion-exchange membrane will normally be in the vicinity of about 150 pounds per square inch. Good results therefore will be obtained when the total tension applied to the reinforcing members in each unit of cross-sectional area of the membrane intersected by such members is at least 150 pounds per square inch of cross-sectional membrane area. In other words, it is preferred that the tension applied to the reinforcing members is such that the product of the number of members per square inch of cross-sectional area of the membrane intersected by such members times the elongating tension per member exceeds 150 pounds per square inch of membrane cross-sectional area, and preferably reaches 400 to 500 pounds per square inch of cross-sectional membrane area. The reinforcing members can be formed of any material possessing the necessary tensile strength, and they can be monofilamentary, or multifilamentary and twisted as in the case of threads, cords, or the like, or they can be in the shape of rods or coiled springs. Woven or felted reinforcing members can also be used. Preferably, the reinforcing members will possess an irregular surface to increase the friction between the bonding plastic and the reinforcing members. Twisted cords provide such an irregular surface and are therefore preferred. Reinforcing members can be further improved for the purposes of this invention by the provision of artificial irregularities such as spaced knots. In the case of rigid reinforcing members integral irregularities in the form of projections can be provided. By way of example, excellent results can be obtained when the reinforcing members are made from cords of spun glass or quartz fibers. Good results are also obtainable with filaments or cords of nylon, rayon, cotton, linen, ramie, jute, synthetic polyester fibers, for example, glycol terephthalate polymer fibers, and other materials. While the reinforcing members will usually be electrically non-conductive, conductive materials, such as steel wire or screen, can be used, provided that they are electrically and electrolytically insulated.

Any electrolytically inert organic plastic can be used to form the bonding matrix. For example, excellent results are obtainable with methyl methacrylate polymers and with styrene-divinyl benzene copolymers. Other materials that can be used include heat-hardenable, or thermosetting, aldehyde-type resins, e.g., of the type containing a plurality of —$CH_2$—, i.e., methylene, linkages, such as phenol- or urea-formaldehyde resins, or alkyd-type resins, e.g., glyceryl phthalate or maleate, and the like, but resins or polymers derived from monomeric substances having the molecular structure $CH_2\!=\!C\!<$ are preferred. Examples of such resins are polymers of vinyl aliphatic compounds such as vinyl halides, e.g., vinyl chloride, alkyl acrylate esters of lower aliphatic alcohols, e.g., methyl and ethyl methacrylate, butadiene 1,3, and polyethylene and the like, and polymers of vinyl aromatic compounds such as styrene, ortho, meta, and para methyl- and ethyl-styrene, vinyl naphthalene and homologous compounds. The foregoing can be used in the form of homopolymers or heteropolymers as in the case of copolymers of styrene and butadiene 1,3, cross-linked copolymers, such as copolymers of styrene and divinyl aromatic compounds such as divinylbenzene, divinyl toluene, divinyl xylene, divinyl naphthalene and the like are especially good. Other copolymers that can be used include copolymers of vinyl chloride and esters of lower aliphatic acids and vinyl alcohol. The foregoing organic plastic matrials can be employed as monomers together with polymerization catalysts and/or accelerators, or as polymers in the case of thermoplastic materials.

The ion-exchange particles can be of the cationic or anionic type and of the strong or weak acid or base type, and they can be made of synthetic or naturally occurring materials, and they may be characterized by a plurality of recurring functional groups, such as

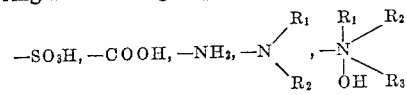

or the like, that are chemically associated with a polymeric or macromolecular material, where $R_1$ is a low molecular weight hydrocarbon or alkylol radical, and $R_2$ and $R_3$ are either hydrogen or radicals of the same kind as $R_1$. Naturally, the hydrogen ions of the acidic groups, and the hydroxyl ions of the basic groups can be replaced by other cations or anions exchangeable respectively therewith, and the invention includes the thus-exchanged groups. By way of example, excellent results can be obtained with sulfonated, or with hydrolyzed, chloromethylated and trimethylamine-quaternized styrene-divinyl benzene copolymers. Examples of other natural and synthetic ion-exchange materials that can be used include cation-exchangers such as montmorillonite, kaolinite, glauconite and shale, sulfonated phenol-formaldehyde resins, polymethacrylic acid, copolymers of styrene, divinylbenzene and maleic anhydride or acrylic acid; weakly basic anion-exchange resins such as nitrated and reduced copolymers of copolymers of styrene and divinylbenzene, and polymers of aniline, dimethylaniline or di-n-propylaniline and formaldehyde; and strongly basic anion-exchange resins such as phenolic methylene resins or various polystyrene-divinylbenzene resins that have been haloalkylated and quaternized with a tertiary amine such as trimethylamine and dimethylethanol-amine.

The ion-exchange material used in forming the membranes of this invention may comprise about 30 to 80 percent of the ultimate structures as is conventional, but it is a special advantage of the present invention that the proportion of ion-exchange material can be increased beyond the previous practical limits to about 90 percent or more.

Figure 2:
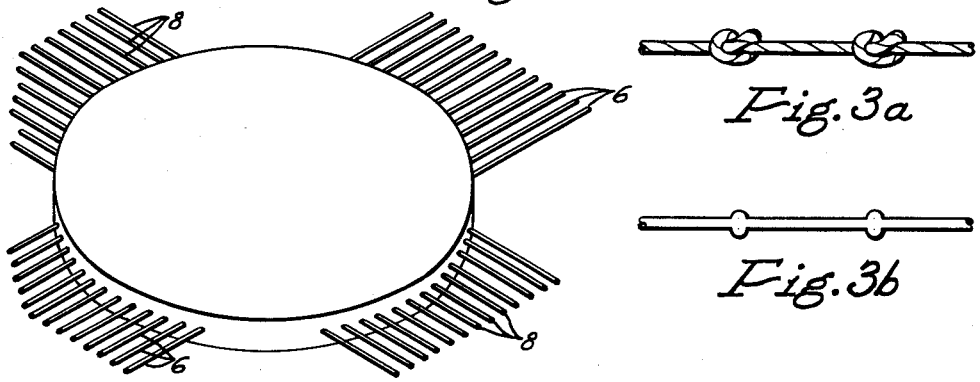
Figure 3A:
Figure 3B:
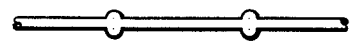
Figure 4:
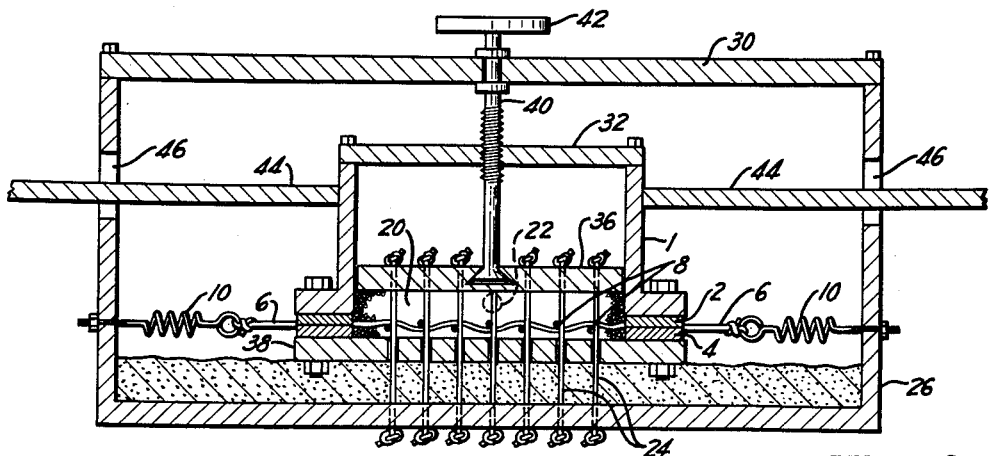

Referring now to the figures of drawing, in FIGURE 1 there is shown a schematic representation in vertical section of a press for molding pre-stressed heterogeneous ion-exchange membranes in accordance with this invention. In FIGURE 2 there is shown a pre-stressed membrane obtainable with the apparatus shown in FIGURE 1. FIGURES 3a and 3b are fragmentary views of elongated reinforcing members having irregular surfaces. FIGURE 4 depicts schematically and in vertical section an apparatus for molding pre-stressed, reinforced heterogeneous ion-exchange membranes in which three groups of parallel reinforcing members are disposed at right angles to each other.

As indicated above, membranes prepared in accordance with this invention possess electrical properties that are entirely distinct from those of comparable membranes that contain the same kinds and proportions of ion-exchange material and bonding plastic, but that contain no pre-stressed reinforcing members. These unusual electrical properties come about as a result of the additional constrictive forces that are maintained upon the outer surfaces of the ion-exchange particles. Thus, the forces tending to constrict the ion-exchange particles in a conventional heterogeneous ion-exchange membrane comprise only the forces tending to cause the bonding plastic to cohere and to resist deformation. In contrast, the forces tending to constrict the ion-exchange particles in the membranes of this invention comprise the sum of the forces normally tending to cause the bonding plastic to cohere and resist deformation plus whatever increment of constrictive force is applied to the bonding plastic by the pre-stressed reinforcing members. Thus, a heterogeneous ion-exchange membrane containing pre-stressed reinforcing members will more greatly restrict absorption of water and swelling by the ion-exchange particles in the membrane than will a comparable membrane containing no pre-stressed reinforcing members. The exclusion of a portion of the water that normally would be absorbed by the ion-exchange particles effectively increases the concentration of the dissociable ions within the pores or passageways of the ion-exchange particles. In accordance with the Donnan theory, the concentration within the pores of the ion-exchange material of an ion in solution outside the pores will be inversely proportional to the concentration of the dissociable ions of the ion-exchange material within such pores. Thus, the use of pre-stressed reinforcing members in heterogeneous ion-exchange membranes reduces the concentration within the pores of the ion-exchange material of the ions in the solution outside the pores, i.e., improves the permselectivity of such membranes, by effectively increasing the concentration of the dissociable ions of the ion-exchange material within the pores of such ion-exchange material. Since the improvement in permselectivity is achieved without increasing the relative proportion of bonding plastic in the membranes, there is no corresponding reduction in the conductivity of the membranes of this invention. In fact, unusually good conductivity can be obtained in such membranes by increasing the proportion of ion-exchange particles therein. Such increase can be effected practically because the additional mechanical strength imparted by the pre-stressed reinforcing members will make up for the loss of strength that accompanies a reduction in the proportion of the bonding plastic.

In the use of the apparatus shown in FIGURE 1, reinforcing members 6 and 8 are stretched so that a tension averaging about 150 to 1000 pounds per square inch of cross-sectional membrane area is attained. This is achieved by attachment of the reinforcing members to a plurality of springs 10 which are in turn placed under tension. The pre-stressed reinforcing members 6 and 8 are then disposed between the opposing surfaces of resilient gasket members 2 and 4. The bolts connecting the bottom plate 16 and upper housing 1 of a mechanical or hydraulic press are then tightened so that gaskets 2 and 4 will frictionally engage pre-stressed reinforcing members 6 and 8. At this point the tension on springs 10 can be released if desired, the tension of the reinforcing members within the press being maintained by friction with the gaskets 2 and 4. The interior of the press is now filled to the desired level above the reinforcing members with a mixture comprising about 10 to 70 percent of an electrolytically inert, synthetic thermoplastic resin, such as polystyrene or polymethylmethacrylate, in a finely-divided form, that is, in a form such as at least to pass a 60 mesh screen and preferably at least to pass a 120 mesh screen, or a liquid monomeric resin containing a polymerization catalyst and/or that can be cured by application of heat, and 30 to 90 percent of an ion-exchange material in finely-divided form, that is, in a form such as to pass an 80 mesh screen and preferably to pass a 120 to 325 mesh screen. Screen mesh sizes referred to herein are in terms of U.S. sieve series screens. The level to which the mold cavity is filled is such that when the mixture is compacted, a membrane will be formed having a thickness at least about 0.5 mm., usually about 0.5 to about 2 mm., preferably less than 1.5 mm.

After the mold cavity within the press is filled to the desired level with a mixture of finely-divided ion-exchange material and bonding resin, pressure is applied to piston 18 of the press in the amount of about 1000 to 50,000 p.s.i., preferably about 2000 to 6000 p.s.i., and the entire assembly is heated to a degree sufficient to melt the solid particles of thermoplastic bonding resin, or to cause polymerization of the resin monomer.

If desired, the finely-divided ion-exchange material can be introduced into the mold cavity separately and compacted under pressure by piston 18, and while the pressure on piston 18 is maintained, the air associated with the compacted particles can be evacuated through port 22. While the partial vacuum is maintained, liquid polymerizable resin such as a liquid styrene monomer containing a polymerization catalyst e.g., benzoyl peroxide, is injected into the mold cavity through port 22 under a pressure less than that maintained on piston 18.

After the bonding resin has hardened, the heterogeneous ion-exchange membrane may be removed from the mold and cut, sawed or otherwise shaped as desired.

In the apparatus of FIGURE 4 the horizontal reinforcing members are first arranged as described in connection with the apparatus of FIGURE 1. Then, with the top 30 of outer mold assembly 26 and the top 32 of the press removed, vertical reinforcing members 24 are strung loosely from the piston member 36 of the press through perforations in the bottom plate 38 of the press and through perforations in the bottom of outer mold assembly 26. The finely-divided ion-exchange material either with or without the bonding resin, as described in connection with the apparatus in FIGURE 1, is then placed in the press to the desired level above the horizontal reinforcing members 6 and 8. The top 32 of the press and the top 30 of the outer mold assembly 26 are now fixed in place, whereby piston 36 is positioned within the press at the same time. The vertical reinforcing members 24 are now subjected to tension, of about the same total magnitude as that employed with the horizontal members 6 and 8. The tension on springs 10 is now released, but the tension on horizontal reinforcing members 6 and 8 within the press is maintained due to their frictional engagement with gasket members 2 and 4. Pressure sufficient to compact the particles in the mold is now applied to piston 36 by clockwise rotation of handwheel 42. The flanges on the upper portion of piston rod 40 engage the top 30 of outer mold assembly 26 and cause movement of the latter in a direction and amount equal to the direction and amount of movement imparted to piston 36. The vertical reinforcing members 24 are thereby maintained under tension. The upper press housing 1 is maintained in a constant position relative to piston 36 and outer mold assembly 26 by means of supporting members 44 attached to upper press housing 1 and extending through elongated slots 46 in the outer mold assembly 26. Members 44 are fixedly mounted to a base, not shown, outside of the outer mold assembly 26. The elongated slots permit vertical movement of the outer mold assembly 26 relative to the upper press housing 1.

When the desired amount of pressure has been applied to piston 36, the inner mold assembly is heated to melt the particles of thermoplastic bonding resin and/or to accelerate hardening of the liquid resin monomer that is included with the ion-exchange particles or that has been injected therein as described in connection with the apparatus of FIGURE 1. In the instance of a liquid monomeric resin, it may be desirable to place a layer of finely-divided absorbent material such as silica sand beneath the bottom plate 38 of the press to absorb any of the liquid material forced through the perforations of said plate.

Although the structures illustrated in FIGURES 1 and 4 have been described for use in molding ion-exchange membranes under pressure, the same devices can be used for casting heterogeneous ion-exchange membranes by the use of a monomer liquid or polymeric solution or suspension as the bonding material and by omitting application of pressure to the respective piston members.

EXAMPLE 1

In a specific embodiment of the invention, with particular reference to the apparatus shown in FIGURE 1, two groups of parallel strands of glass fiber cord capable of withstanding a tension in excess of 100 pounds are stretched, 10 to the linear inch, at right angles to each other and in a horizontal plane between the upper and lower surfaces respectively of resilient gasket members 2 and 4.

Stretching tension is applied to the respective cords in the amount of 50 pounds each. Thus, the total tension per linear inch along the two reinforced dimensions of the membrane will be 500 pounds. The gasket members are then clamped together by tightening the bolts that join the bottom plate 16 and the upper press housing 1.

The mold cavity is now filled with a mixture of 15 percent polymerized methylmethacrylate powder that has been ground to pass an 80 mesh screen and 85 percent of a phenolic methylene sulfonic cation-exchange resin ("Amberlite IR-100"), having an exchange capacity of 1.75 milliequivalents of potassium hydroxide per 1.75 grams of dry resin and ground to pass a 120 mesh screen, to a level above the reinforcing members. Pressure is now applied to piston 18 in the amount of 2000 p.s.i., to compact the mixture to a thickness of about 1 mm., and the mold assembly is heated to a temperature of 150° F. to melt the particles of methylmethacrylate resin. The mold assembly is then cooled and the resulting heterogeneous cation-exchange membrane is removed. The thus-prepared membrane possesses excellent conductivity and mechanical strength.

EXAMPLE 2

In another embodiment of the invention, there is employed the hydroxide form of a chloromethylated copolymer of 95–97 percent styrene and 5–3 percent divinylbenzene that had been quaternized with trimethylamine. This resin had a minimum exchange capacity of 3.0 milliequivalents per gram of dry resin.

The corresponding chloride form of the resin, marketed commercially as "Amberlite IRA-400" (Cl), has the following characteristics:

Screen grading (wet): 20 to 50 mesh (U.S. standard screen).

*Typical wet screen analysis (U.S. standard screen)*

| Size of mesh: | Percent retained |
|---|---|
| 20 | 17.4 |
| 30 | 45.7 |
| 40 | 30.1 |
| 50 | 6.4 |
| 70 | 0.4 |

Voids: 40–45 percent.
Density (average): 0.65 grams per milliliter (backwashed and drained volume).

A pressure of 4000 p.s.i., is now applied to piston 18 to compact the mixture to a depth of about 1.75 mm. While maintaining this pressure, air is removed from the interstitial voids between the ion-exchange particles through port 22 by means of a vacuum pump not shown. When substantially all air is removed, a liquid bonding agent comprising styrene monomer and containing benzoyl peroxide as a polymerization catalyst is injected into the mold cavity under a pressure of approximately 3500 p.s.i. In this embodiment the bonding resin will comprise about 20 percent of the ion-exchange resin. The entire mold assembly is now heated to about 150° C. to accelerate hardening of the styrene monomer. The mold assembly is now allowed to cool, and the pre-stressed heterogeneous anion-exchange membrane is removed from the mold. The thus-prepared membrane exhibits excellent conductivity and exceptional permselectivity characteristics.

The invention is not restricted to the foregoing embodiments and other materials and conditions disclosed herein can be employed. For example, there can be employed:

| | Example 3 | Example 4 | Example 5 |
|---|---|---|---|
| Bonding Resin: | | | |
| Form | 250 Mesh | Liquid | 325 Mesh. |
| Proportion, Percent | 30 | 50 | 40. |
| Material | Polystyrene | 30% Polystyrene in benzene solution. | Methyl Methacrylate. |
| Ion-Exchange Material: | | | |
| Form | 250 Mesh | 200 Mesh | 325 Mesh. |
| Proportion | 70 | 50 | 60. |
| Material | Maleic Anhydride, Styrene-Divinylbenzene Copolymer. | Nitrated, Reduced Styrene-Divinylbenzene Copolymer. | Aniline-Formaldehyde Resin. |
| Reinforcing Material: | | | |
| Pre-stress Dimensions | 3 | 2 | 2. |
| Members/Inch, No | 15 | 8 | 5. |
| Tension, Lbs | 30 | 100 | 60. |
| Material | Cotton Cord | Nylon Cord | Nylon Rods. |
| Forming Method | Molded, 5,200 p.s.i., 200° C | Cast, Room Temp | Molded, 2,000 p.s.i., 150° C |

Heterogeneous ion-exchange membranes prepared according to the present invention will possess substantially greater physical strength than heterogeneous membranes containing comparable proportions of ion-exchange material and bonding material and that have been prepared according to other processes known in the art. However, it is emphasized that the superiority of membranes prepared according to the present invention is not confined to improved strength, as such membranes also possess modified electrical properties. Since the pre-stressed membranes resist internal swelling by the ion-exchange resin particles to an unusual degree, the permselectivity of the membranes will also be substantially improved. Moreover, the use of a greater proportion of ion-exchange material relative to inert bonding resin, as permitted by the present invention, improves the conductivity and reduces the electrical resistance of the membranes prepared according to this invention, without sacrificing mechanical strength.

Many modifications and variations of the invention as described herein will suggest themselves to those skilled in the art. Obviously, such modifications and variations can be resorted to without departing from the spirit or scope of the invention. Therefore, only such limitations should be imposed in the present invention as are indicated in the claims appended hereto.

Having described the invention we claim:

1. A process of preparing a reinforced heterogeneous ion-exchange membrane comprising subjecting a plurality of elongated reinforcing members to tension along their major axes, forming about said reinforcing members a continuous, coherent, electrolytically conductive resinous structure from a mixture of a moldable, electrolytically inert organic plastic and a plurality of finely-divided, water-insoluble, electrolytically conductive ion-exchange particles, the electrolytically conductive ion-exchange particles being present in a proportion such that the opposing surfaces of said structure are conductively connected by a compact mass of said particles extending therebetween, with contact between adjacent particles, and causing the thus-formed structure to harden, so that the stressed reinforcing members become bonded to said resinous structure, the tension to which said reinforcing members are subjected being such that the sum of the constrictive force imposed upon the ion-exchange particles by the stressed reinforcing members and the constrictive force imposed on said particles by the normal resistance of the organic plastic to deformation is sufficient to withstand the osmotic pressure of said ion-exchange particles.

2. The process of claim 1, where the total tension applied to the reinforcing members per unit cross-sectional area of membrane intersected by such members exceeds 150 pounds per square inch of membrane cross-sectional area.

3. The process of claim 1, where the reinforcing members are arranged in 2 to 3 groups of similarly oriented members, and the groups are oriented at substantially right angles to each other.

4. The process of claim 1, where the reinforcing members are selected from the group consisting of glass and quartz fibers.

5. The process of claim 1, where the organic plastic is a resinous material selected from the group consisting of heat-hardenable aldehyde resin polymers and polymers derived from monomeric materials having the molecular formula $CH_2=C<$, and the ion-exchange material is a synthetic resin selected from the group consisting of resinous polymers having associated therewith a plurality of like, recurring functional groups selected from the group consisting of

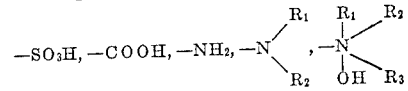

where $R_1$ is a low-molecular weight hydrocarbon or alkylol radical and $R_2$ and $R_3$ are hydrogen or radicals of the same kind as $R_1$.

6. A process of preparing a reinforced heterogeneous ion-exchange membrane comprising disposing a plurality of elongated reinforcing members across at least two dimensions of a mold cavity, subjecting said reinforcing members to tension along their major axes, filling the mold cavity with a moldable material comprising an electrolytically inert bonding resin and particles of an electrolytically conductive ion-exchange material sufficiently small to pass a 60 mesh screen, the weight ratio of an ion-exchange material to said bonding resin being in the range of about 90:10 to about 30:70, and subjecting the moldable material in said mold cavity to pressure in the range of about 1000 to 50,000 p.s.i., under conditions rendering said bonding resin flowable and causing the bonding resin to harden, the tension to which said reinforcing members are subjected being such that the sum of the constrictive force imposed upon the ion-exchange particles by the stressed reinforcing members and the constrictive force imposed on said particles by the normal resistance of the organic plastic to deformation is sufficient to withstand the osmotic pressure of said ion-exchange particles.

7. A heterogeneous ion-exchange membrane comprising an electrolytically inert organic plastic matrix having a plurality of finely-divided electrolytically conductive ion-exchange particles uniformly distributed therein, said membrane having its opposing surfaces conductively connected through a compact mass of said particles extending therebetween, with contact between adjacent particles, and containing a plurality of pre-stressed reinforcing members transverse at least one dimension of said membrane, said organic plastic being bonded to said pre-stressed reinforcing members, said reinforcing members being pre-stressed in tension, the tension to which said reinforcing members are subjected being such that the sum of the constrictive force imposed upon the ion-exchange particles by the stressed reinforcing members and the constrictive force imposed on said particles by the normal resistance of the organic plastic to deformation is sufficient to withstand the osmotic pressure of said ion-exchange particles.

8. The membrane of claim 7, where the reinforcing members are arranged in two to three groups of similarly oriented members, and where the groups are oriented at substantially right angles to each other.

9. The membrane of claim 7, where the reinforcing members are selected from the group consisting of glass and quartz fibers.

10. The membrane of claim 7, where the organic plastic is a resinous material selected from the group consisting of aldehyde resins and polymers derived from monomeric materials having the molecular formula $CH_2=C<$, and where the ion-exchange material is a synthetic resin selected from the groups consisting of resinous polymers having chemically associated therewith like, recurring functional groups selected from the group consisting of

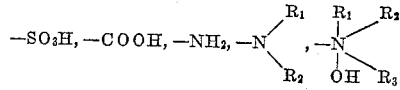

where $R_1$ is a low-molecular weight hydrocarbon or alkylol radical and $R_2$ and $R_3$ are hydrogen or radicals of the same kind as $R_1$.

11. The membrane of claim 7, where the particles of ion-exchange material are sufficiently small to pass a 60 mesh screen and where the weight ratio of ion-exchange material to electrolytically inert organic plastic is in the range of about 90:10 to about 30:70.

References Cited in the file of this patent

UNITED STATES PATENTS

| | | |
|---|---|---|
| 2,219,054 | Palm | Oct. 22, 1940 |
| 2,425,883 | Jackson | Aug. 19, 1947 |
| 2,456,162 | Waterbury | Dec. 14, 1948 |
| 2,636,851 | Juda | Apr. 28, 1953 |
| 2,698,558 | Hawley | Jan. 4, 1955 |
| 2,726,923 | Schleich | Dec. 13, 1955 |

OTHER REFERENCES

Wyllie: "Journal of Physical and Colloid Chemistry," vol. 54, 1950, pages 204–226.